United States Patent [19]

Wygodny et al.

[11] Patent Number: 5,657,438
[45] Date of Patent: Aug. 12, 1997

[54] INTERACTIVE SYSTEM FOR DEVELOPING TESTS OF SYSTEM UNDER TEST ALLOWING INDEPENDENT POSITIONING OF EXECUTION START AND STOP MARKERS TO EXECUTE SUBPORTION OF TEST SCRIPT

[75] Inventors: Shlomo Wygodny, Ramat Hasharon; Shahar Zohar, Rfar Saba; Alex Azulay; Yochanan Slonim, both of Herzlia; David Weinbaum, Tel Aviv, all of Israel

[73] Assignee: Mercury Interactive (Israel) Ltd., Sunnyvale, Calif.

[21] Appl. No.: 319,309

[22] Filed: Oct. 6, 1994

Related U.S. Application Data

[63] Continuation of Ser. No. 716,945, Jun. 18, 1991, abandoned, which is a continuation-in-part of Ser. No. 690,878, Apr. 23, 1991, abandoned, which is a continuation-in-part of Ser. No. 618,742, Nov. 27, 1990, abandoned.

[51] Int. Cl.$^6$ .................. G06F 11/00; G06F 11/34
[52] U.S. Cl. ............... 395/180; 395/183.13; 395/183.14; 395/183.21; 395/701
[58] Field of Search ............... 395/700; 364/280.4

[56] References Cited

U.S. PATENT DOCUMENTS

| | | | |
|---|---|---|---|
| 4,696,003 | 9/1987 | Kerr | 371/19 |
| 4,819,233 | 4/1989 | DeJucia | 371/19 |
| 4,969,003 | 11/1990 | Kerr et al. | 371/19 |
| 5,005,119 | 4/1991 | Rumbaugh et al. | 364/DIG. 1 |
| 5,022,028 | 6/1991 | Edmonds | 371/25.1 |
| 5,045,994 | 9/1991 | Beller | 364/200 |
| 5,121,497 | 6/1992 | Kerr et al. | 395/650 |
| 5,140,671 | 8/1992 | Hayes | 395/76 |
| 5,157,779 | 10/1992 | Washburn et al. | 395/575 |
| 5,157,782 | 10/1992 | Tuttle | 395/575 |
| 5,170,465 | 12/1992 | McKeeman et al. | 395/700 |
| 5,182,806 | 1/1993 | McKeevan et al. | 395/700 |
| 5,193,191 | 3/1993 | McKeeman et al. | 395/700 |
| 5,201,050 | 4/1993 | McKeeman et al. | 395/700 |
| 5,218,605 | 6/1993 | Low et al. | 371/16.1 |
| 5,265,254 | 11/1993 | Blasciak et al. | 395/700 |
| 5,313,387 | 5/1994 | McKeeman et al. | 395/700 |

OTHER PUBLICATIONS

Article "Ferret of TiGuron Systems" San Jose, CA (2 pgs).
Article "Pre Vue–X of Performance Awareness" Raliegh N.C. (9 pgs.).
Article "SQA: Robot of Software Quality Automation" Lawrence M.A. (18 pgs).
Article "Capbak of Software Research, IVE.," San Francisco, CA (1 page).

*Primary Examiner*—Alvin L. Oberley
*Assistant Examiner*—Jonathan Hall Backenstose
*Attorney, Agent, or Firm*—Ladas & Parry

[57] ABSTRACT

A system for developing tests of a System Under Test (SUT) which includes a Central Processing Unit (CPU), a screen and input apparatus. The system for developing tests includes a manipulation apparatus enabling an operator to manipulate, within a test workspace, a sequence of test script statements into a desired script, wherein the test script statements describe operator commands to the SUT and screen capture and verify operations and b) interactive execution apparatus for executing at least a portion of the desired script by providing the at least a portion of the desired script to the SUT thereby to operate the SUT as desired.

19 Claims, 1 Drawing Sheet

INTERACTIVE SYSTEM FOR DEVELOPING TESTS OF SYSTEM UNDER TEST ALLOWING INDEPENDENT POSITIONING OF EXECUTION START AND STOP MARKERS TO EXECUTE SUBPORTION OF TEST SCRIPT

This is a continuation of application Ser. No. 07/716,945 filed Jun. 18, 1991 which is a continuation-in-part of application Ser. No. 07/690,878 filed Apr. 23, 1991 which is a continuation-in-part of application Ser. No. 07/618,742 filed Nov. 27, 1990 (all now abandoned).

COPENDING APPLICATIONS

The following applications are applications of this application:

Ser. No. 08/298,357, now U.S. Pat. No. 5,511,185, titled "System For Automatic Testing Of Computer Software Having Output Synchronization And Capable Of Responding To Asynchronous Events", a continuation of Ser. No. 07/690,878, now abandoned, a continuation-in-part of Ser. No. 07/618,742, now abandoned.

Ser. No. 08/485,050, titled "A System For Tracking And Replicating The Operation Of A Cursor Manipulation Device", a divisional of Ser. No. 08/298,357, now U.S. Pat. No. 5,511,185, a continuation of Ser. No. 07/690,878, now abandoned, a continuation-in-part of Ser. No. 07/618,742, now abandoned.

FIELD OF THE INVENTION

BACKGROUND OF THE INVENTION

Systems for testing the operation of a computer system are known in the art. They are typically used to compare the operation of an application before and after the application has been substantially changed.

To do this, the testing system, before the changes are made, typically captures input device events, such as from a mouse or a keyboard, which occur as an operator uses the System Under Test (SUT). It also typically captures the output to a screen as a result of the input device events. This process is known as "recording".

The captured data is stored until it is desired to replay the events, such as after the changes have been made, during which the monitor output is captured and compared to that which was captured in the earlier recording operation.

The data is typically stored as a series of characters, pixels, etc. This representation is not user-friendly and does not provide any convenient method for modifying the contents. As a result, every time the user application is modified, the operator must recreate the test.

Testing systems can also include a method by which tests can be written. This is typically performed via a Test Script Language (TSL) in which the operator prepares a script containing the operations he desires the SUT to perform, without having to capture the input device and screen events first. This process is known as "programming".

The Evaluator, manufactured by Elverex Limited of Limerick, Ireland, is a testing system which contains such a test script language. The programmed script has to be compiled before it can be used to run the SUT. Also, the Evaluator provides a high level description of that which has occurred during a recording session. This description is in a language different from the programmable test script language.

CheckMate, manufactured by Pilot Research Associates of Vienna, Va., U.S.A., uses the C programming language as the recording language as well as the language in which scripts are programmed. Similar to the Evaluator, the script has to be compiled first.

SUMMARY OF THE INVENTION

It is therefore an object of the present invention to provide a system for developing tests which attempts to overcome the deficiencies of the prior art.

There is therefore provided, in accordance with an embodiment of the present invention, a system for developing tests of a System Under Test (SUT) which includes a Central Processing Unit (CPU), a screen and input apparatus. The system for developing tests includes a) manipulation apparatus enabling an operator to manipulate, within a test workspace, a sequence of test script statements into a desired script, wherein the test script statements describe operator commands to the SUT and screen capture and verify operations and b) interactive execution apparatus for executing at least a portion of the desired script by providing the at least a portion of the desired script to the SUT thereby to operate the SUT as desired.

Additionally, in accordance with an embodiment of the present invention, the system of the present invention also includes transformation apparatus for transforming at least one of an operator command from the input apparatus and a screen image visible on the screen to a corresponding higher level test script statement and for entering the test script statement into the test workspace.

Further, in accordance with an embodiment of the present invention, the manipulation apparatus includes editor apparatus for editing the test script statements and the execution apparatus includes interpreter apparatus for causing at least a portion of the desired script to be executed by the SUT without performing any preliminary processing on the portion of the script.

Still further, in accordance with an embodiment of the present invention, the system of the present invention also includes data capture and replay apparatus for capturing at one time and for providing to the transformation apparatus at least one of the operator command and the screen image, for replaying the operator command to the CPU in accordance with instructions from the execution apparatus and for verifying that the screen image is generally identical to a saved screen image.

Moreover, in accordance with an embodiment of the present invention, the test script statements include instructions to the SUT and instructions to the data capture and replay apparatus.

Additionally, in accordance with an embodiment of the present invention, the transformation apparatus operates in near real-time.

Furthermore, in accordance with an embodiment of the present invention, the execution apparatus includes debugger apparatus for providing a plurality of debug conditions and for halting execution of the script when one of the debug conditions is met. In accordance with an embodiment of the present invention, one of the debug conditions is 'Break on Mismatch' which causes the debugger apparatus to halt execution if a screen verification fails.

Still further, in accordance with an embodiment of the present invention, the editor apparatus includes apparatus for providing an execution marker indicating a currently executed test script statement and the execution apparatus includes apparatus for indicating to the editor apparatus to move the execution marker to a next test script statement to be executed. The editor apparatus includes execution marker moving apparatus enabling a user to move the execution marker to a desired next test script statement to be executed.

Moreover, in accordance with an embodiment of the present invention, the system of the present invention also includes apparatus for aborting execution.

There is also provided, in accordance with an embodiment of the present invention, a method for developing tests of a System Under Test (SUT) which includes a Central Processing Unit (CPU), a screen and input apparatus. The method includes the steps of a) enabling an operator to manipulate, within a test workspace, a sequence of test script statements into a desired script, wherein the test script statements describe operator commands to the SUT and screen capture and verify operations and b) interactively executing at least a portion of the desired script by providing the at least a portion of the desired script to the SUT thereby to operate the SUT as desired.

Moreover, in accordance with an embodiment of the present invention, the method includes the steps of transforming at least one of an operator command from the input apparatus and a screen image visible on the screen to a corresponding higher level test script statement and entering the test script statement into the test workspace.

Additionally, in accordance with an embodiment of the present invention, the step of enabling includes the step of editing the test script statements and the step of executing includes the step of causing at least a portion of the desired script to be executed by the SUT without performing any preliminary processing on the portion of the script.

Further, in accordance with an embodiment of the present invention, the step of transforming includes the steps of capturing at one time at least one of the operator command and the screen image, replaying the operator command to the CPU and verifying that the screen image is generally identical to a saved screen image.

Still further, in accordance with an embodiment of the present invention, the step of transforming occurs in near real-time.

Moreover, in accordance with an embodiment of the present invention, the step of executing includes the steps of providing a plurality of debug conditions and halting execution of the script when one of the debug conditions is met.

Additionally, in accordance with an embodiment of the present invention, the step of editing includes the step of providing an execution marker which indicates a currently executed test script statement and the step of executing includes the step of moving the execution marker to a next test script statement to be executed.

Finally, in accordance with an embodiment of the present invention, the step of editing includes the step of enabling a user to move the execution marker to a desired next test script statement to be executed.

BRIEF DESCRIPTION OF THE DRAWINGS

The present invention will be understood and appreciated more fully from the following detailed description taken in conjunction with the drawings in which.

DETAILED DESCRIPTION OF PRESENT INVENTION

Figure 1:
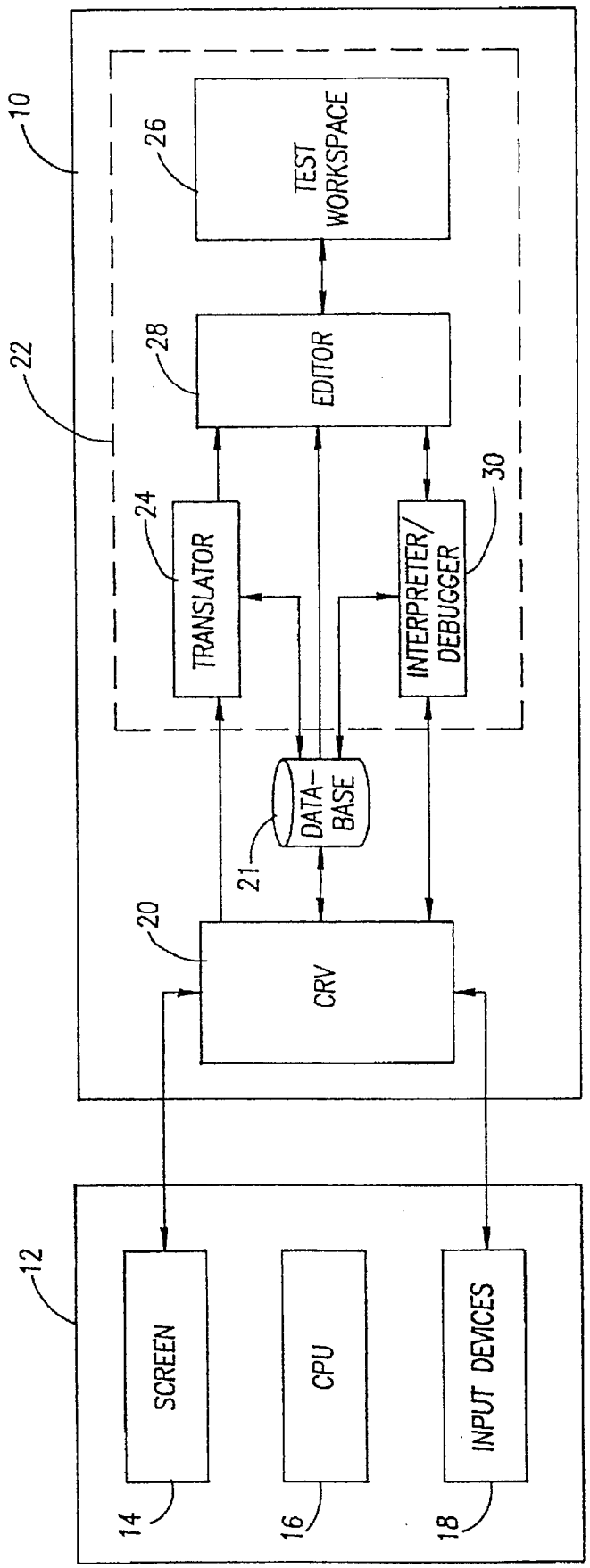
FIG. 1 is a schematic illustration of the system for developing tests constructed and operative in accordance with the present invention.

Reference has been made in this specification to several appendices, labeled "Annex A" through "Annex D" which are included herein. Reference has also been made to a further appendix, which can be found as annex D of U.S. Pat. No. 5,511,185.

Reference is now made to FIG. 1 which schematically illustrates the system 10 of the present invention for developing tests of an SUT 12.

Minimally, a SUT 12 comprises a screen 14, such as on a monitor, a Central Processing Unit (CPU) 16, and at least one input device 18, such as a keyboard or a pointing device, such as a mouse, a track ball or a stylus.

The system 10 of the present invention typically comprises a Capture, Replay and Verify module (CRV) 20 for capturing both input events from input device 18 and images output to screen 14, during recording operations, for replaying input events to input device 18 during replay operations and for verifying that a captured screen appears as it previously appeared.

The system typically also includes a database 21 for storing the captured input events, screen images and other data which it is desired to store. For mouse or other pointing device operations, the database 21 also stores sequences of input events as "mouse tracks", tracks along which the locator, or pointing device icon, traveled.

An example CRV 20 is described in Assignee's, copending applications, U.S. Ser. No. 07/618,742 and Ser. No. 07/690,878, which became U.S. Pat. No. 5,511,185, both now abandoned, comprising specialized hardware and software to operate the hardware. Alternatively, the operations described therein can be performed in software alone.

The input events and the screen images are captured in the form of machine-readable digital data where the data is in the form of assembler-like commands comprising two parts, operation codes (OPCODES), such as KEY_PRESS and CAPTURE_SCREEN, and data relating to the OPCODE. The OPCODES describe the kind of action which occurred and the data contain information, such as the specific keys which were pressed.

The commands are provided to a test manager 22 which translates them to statements in a Test Script Language (TSL), a language resembling a high level programming language. The test manager 22 also enables the operator to edit and manipulate the TSL statements to provide a desired script describing the operations the operator desires that the SUT 12 perform. Furthermore, the test manager 22 executes the script, thereby causing the SUT 12 to operate.

The test manager 22 typically comprises a translator 24 for translating the commands from the CRV 20 to TSL statements, a test workspace 26 for receiving and displaying the TSL statements, an editor 28 for enabling an operator to manipulate the TSL statements in the test workspace 26 to create desired script and an interpreter/debugger 30 for operating the SUT 12 via the CRV 20 in accordance with the script. The latter operation is known as "running" or "executing" the script.

Each of the translator 24, editor 28 and interpreter/debugger 30 communicates with the database 21.

Execution is typically performed in either the "replay" mode or the "verify" mode. In both modes, the test manager 22 provides commands to the CRV 29 and the CRV 29 provides the machine-readable digital data to the SUT 12. In the replay mode, the CRV 20 captures the output to the screen 14 according to an OPCODE CAPTURE_SCREEN. In the verify mode, the CRV 20 captures the output to the screen 14, compares it to a screen image stored in database 21, in accordance with an OPCODE VERIFY_SCREEN and provides the results to the interpreter/debugger 30.

During execution, the CRV 20 receives the commands from the interpreter/debugger 30 and transforms them into the machine-readable digital data needed by the input device 18 or, for screen capture or verify operations, respectively captures or verifies the output of the screen 14. It will be appreciated that during execution, no recording occurs.

The interpreter/debugger 30 and the translator 24 both have access to database 21 as necessary.

The interpreter/debugger 30 typically executes the script from a specified location in the script, marked by an execution marker, until the script finishes. It also has debugging features, such as executing one statement only, in an operation called "single step", or executing until a breakpoint is activated.

A breakpoint can be a condition related to the script, such as halting when the execution arrives at a specified TSL statement, or it can be any type of situation at which the operator desires to investigate the operation of the SUT 12. For example, a mismatch breakpoint can be set to occur when the VERIFY_SCREEN operation discovers mismatches in the stored and captured screen images.

The execution marker is typically implemented by highlighting the current execution line. The marker can be moved to any line in the TSL script, as the operator desires, and execution will begin at the new location of the marker.

In accordance with the present invention, execution can be aborted at any time, as desired by the operator.

An operator typically will utilize the system 10 as follows: The operator will first operate the SUT 12 as desired while the test manager 22 records, in near real-time, the operations in the current test workspace 26 as a sequence of TSL statements.

If, for example, the operator moved a mouse to certain location, clicked the left mouse button and then typed the word "John" into a data entry form, the test workspace 26 might include in it the following sequence of TSL statements:

move_locator_abs(0,0);
move_locator_track(1);
mtype("<kLeft>)";
type ("John");

Since the sequence is in the test workspace 26 on which the editor 28 operates, the operator can, in accordance with the present invention, modify the sequence as he desires, including commenting the script, modifying the recorded characters or keys, placing the sequence, or parts of it, within a loop thereby to cause it to repeat a desired number of times. He can also add conditional statements and/or other operations not already recorded.

An exemplary modification of the above script might be:

```
for (i=0; i<5; i++){
    move_locator_abs(0,0);      /*Move mouse to appropriate
    move_locator_track(1);        point on screen */
    mtype("<kLeft>)";            /*Click on left mouse button */
    /*Data entry form opened - check it */
    status = check_screen("form1");
    if (status!=SUCCESS)
        tretum;
    type("Jon<kReturn>");        /*Enter data and submit form */
}
```

In accordance with the present invention, the script language is similar to the C programming language, as described in more detail hereinbelow. The /*, */ bracket comments regarding the operations performed and tretum causes the testing to stop and control to be returned to editor 28. Move_locator_track(1) moves the locator along the track number 1 as stored in database 21.

The statement check_screen("form1") commands the CRV 20 to perform a screen capture or a screen comparison with the stored screen "form1". The choice of operations (capture or comparison) depends on the mode of operation, replay or verify, that the operator has chosen.

At any time during the editing, the operator can invoke the interpreter/debugger 30 to perform the statement listed at the current location of an execution marker. By "performing the operation" it is meant providing the machine-readable data to the SUT 12, via CRV 20, and, if selected, capturing the response of the SUT 12 to the machine-readable data.

Because the interpreter/debugger 30 interprets the TSL script, there is no compilation of the TSL script or linkage to a library, such as in the prior art.

The execution can be of Just the statement listed at the current location of the execution marker, in single-step mode, or of a group of statements beginning at the current location of the execution marker.

In accordance with a preferred embodiment of the present invention, when the interpreter/debugger 30 finishes, it returns control to the editor 28. Thus, the operator can directly test the response of the SUT 12 to certain sequences of TSL statements, without leaving the editor 28.

In accordance with the present invention, the test manager 22 is implemented with a graphics user interface where the various operations are accessible via menus. By selecting the appropriate menu, the operator can create, edit, replay, verify and display a script in the test workspace 26. If the operator chooses to record the operations of the SUT 12, the operations are provided to the test workspace 26, as described hereinabove. At any point, the operator can stop the recording and begin modifying the recorded script. At any time during the modification, the operator can execute any portion of the script by placing the execution marker at the desired location and issuing a Run command.

The construction and operation of each of the translator 24, the editor 28 and the interpreter/debugger 30 will now be described in detail hereinbelow.

OPERATION OF CRV 20

The elements of CRV 20 pertinent to this invention will be described hereinbelow. The remaining details are described in detail in the above-mentioned applications, U.S. Ser. No. 07/618,742 and 07/690,878, which became U.S. Pat. No. 5,511,185.

During a record operation, the CRV 20 provides to the test manager 22 commands containing OPCODES describing the action of the SUT 12. During a replay operation, the test manager 22 provides OPCODES to the CRV 20, either to be passed, together with the appropriate data, to the SUT 12 or to be used as instructions to the CRV 20. The behavior of the CRV 20 is defined by the following OPCODES, which are listed and defined in Table 1.

TABLE 1

| OPCODE Descriptions | |
| --- | --- |
| OPCODE | Description |
| KEY_PRESS | Press a key on a keyboard |
| KEY_RELEASE | Release a key on a keyboard |
| MOUSE_BUTTONS | Press/release buttons on a pointing device |

TABLE 1-continued

OPCODE Descriptions

| OPCODE | Description |
| --- | --- |
| TIMING | Wait a length of time |
| MOVE_LOCATOR | Move the locator (icon) to a given coordinate location (for Replay mode) |
| MOVE_LOCATOR_TRACK | Move locator along a given path. The path coordinates are stored in the database 21 |
| GET_LOCATOR_POSITION | Return the current locator position on the SUT screen |
| CAPTURE_SCREEN | Capture the SUT screen image and save it in the database 21 with a title |
| VERIFY_SCREEN | Verify that the SUT screen image is identical to the one saved in the database. |
| SOFTKEY | A check_screen key is pressed. The check_screen key is a key on the SUT which has been designated to indicate, during recording, the operator's request that a check_screen be performed. |
| SET_RECORD | Start/Stop record mode in the CRV 20 |
| ABORT | Abort execution of current command |

TSL Programming Syntax

TSL is a programming language similar to the C programming language and based on the AWK programming language. It includes all of the functions of AWK as well as some functions added for the purposes of testing.

In the interest of conciseness and clarity, a description of the AWK functions and syntax of TSL will not be included. They can be found in the book *The AWK Programming Language* by A. V. Aho, B. W. Kerninghan and P. J. Weinberger, Addison-Wesley, 1988, which book is incorporated herein by reference. Appendix A of the above-referenced book includes a full description of the AWK syntax.

In accordance with the present invention, a few new syntax structures and some new functions were added to the AWK language to create the TSL language. The new syntax structures are as follows:

call id (opt_exp_list);

treturn

'Call id' calls to another test whose name is 'id' and which has the arguments 'opt_exp_list'. 'Call id' operates as a function call where the 'function' is a test script rather than an algorithmic operation. 'Treturn' returns control from the middle of a called test to the test which called it in a manner similar to the function 'return' which is operative for algorithmic operations.

The new functions are as follows:

move_locator_abs (x,y)

move_locator_tel (dx,dy)

move_locator_track (track_number)

get_x ( )

get_y ( )

check_screen (screen_name, delta_time)

pause (string)

get_time ( )

wait (time)

type (type-string)

mtype (type-string)

Move_locator_abs and move_locator_rel move the locator respectively to an absolute location (x,y) or a relative location (dx,dy) on the screen 14. Move_locator_track moves the locator along a given path. The path coordinates are saved in database 21. Get_x and get_y return the current locator position on the screen 14.

Check_screen waits a given length of time. If replay mode has been selected, check_screen sends a CAPTURE_SCREEN command to the CRV 20 after the wait. If verify mode has been selected, the check_screen sends a VERIFY_SCREEN command to the CRV 20 and awaits the results. If the verification failed and a mismatch breakpoint is active, then check_screen halts execution of the test.

Pause stops execution of the test and displays the message 'string' in a dialog box. After the operator indicates that he accepts the message, typically by pressing ok on the dialog box, execution is continued.

Get_time returns the current system time. Wait waits the given length of time and then continues execution.

Type and mtype send the string type_string to the SUT, respectively imitating the operation of the keyboard or the buttons of the pointing device.

Type_string is a possibly null list of elements whose formal syntax is given in Annex A, where each element of type_string is defined by a YACC-formatted syntax. YACC is a compiler compiler and is described in the article by S. C. Johnson, "YACC—Yet Another Compiler Compiler", *Computing Science Technical Report #32*, AT&T—Bell Laboratories, Murray Hill, N.J. 1975, which article is incorporated herein by reference.

The following is an informal discussion of the syntax of type_string.

If an element in type_string is an alphabetic character, then the character will be provided.

Key names that require more than one character, such as the shift or return keys, are listed between greater than and less than characters, beginning with a 'k'. For example, <kShift> and <kReturn>.

Desired timings between keystrokes are indicated by a 't' and an integer value indicating the number of seconds to wait, located between greater than and less than characters. For example, <t25>.

A key sequence of more than one key pressed at once is indicated by a '-' between key strokes. For example, <kAlt-j> means to press the Alt character together with the 'j' and <kAlt-kCtrl-kDel> means to press the characters Alt, Ctrl and Del at once.

To specify separate pressing and releasing of a key, the characters '-' for press and '+' for release are used. For example, <kCtrl>-<t20>y-<kCtrl>+y+ means to press and hold the Ctrl key, then press and hold the y key for 20 seconds then release the Ctrl key and then release the y key.

Operation of Translator 24

As mentioned hereinabove, the translator 24 receives the commands from the CRV 20 during a recording operation and translates them to TSL statements. The commands received are those whose OPCODES are KEY_PRESS, KEY_RELEASE, MOUSE_BUTTONS, TIMING, MOVE_LOCATOR_TRACK and SOFTKEY. The translation for MOVE_LOCATOR_TRACK and SOFTKEY is generally straight forward. The translation for KEY_PRESS, TIMING, MOUSE_BUTTONS and KEY_RELEASE is more complicated and involves the considerations discussed hereinabove with respect to the statements type and mtype.

For MOVE_LOCATOR_TRACK the translator 24 writes "move_locator_track(track_number);" where 'track_number' is provided by the CRV 20.

For SOFTKEY, the translator writes "check_screen (scrn_i);" where i is incremented with each check_screen operation in accordance with the current value of i as stored in the database 21. The translator 24 also sends a CAPTURE_SCREEN command to the CRV 20 to capture the current image on the screen and to call it 'scrn_i'.

For keyboard keys, the translator 24 typically operates in one of two modes, 'edited key' mode or 'non-edited key' mode. Non-edited key mode causes the commands received from the CRV 20 to be written generally as they were received. In such a mode, 'x-' indicates that the 'x' key was pressed and 'x+' indicates that the 'x' key was released. For example, typing 'Hello' on the SUT 12 will produce the following TSL statement:

type ("<kShift>-h-<kShift>+h+e-e+l-l+o-o+o-o+");

In edited mode, each 'x-x+' is written as a single 'x', <kShift>x is translated to X and sequences such as <kAlt>-x<-kAlt>+x+ are translated to <kAlt-x>. The pressing of the CapsLock key causes the alphabetic keys, following it to be written as capital letters until the CapsLock key is pressed again.

For TIMING, the translator 24 writes "type (<tx>)" where x is the value associated with the TIMING OPCODE. If the TIMING OPCODE comes during a keyboard operation, translator 24 includes the label <tx> along with the other keys which are pressed. For example:

type ("HE<t25>LLO");

C-like pseudocode describing the operation of translator 24 is provided in Annex B.

Operation of the Interpreter/Debugger 30

As mentioned hereinabove, the interpreter/debugger 30 reads TSL statements in the test workspace 26 and executes them. Any non-testing TSL statements are executed by the interpreter/debugger and any testing TSL statements are sent for execution to the CRV 20. In addition, the interpreter/debugger 30 utilizes the editor 28 to display and move the execution marker.

Interpreting a programming language is a well-known technique and is described in detail in the books *Compilers—Principles, Techniques and Tools* by A. V. Aho, R. Sethi, and J. D. Ullman, Addison-Wesley, 1986 and *The UNIX Programming Environment*, by B. W. Kerninghah and R. Pike, Prentice-Hall, 1984. Both books are incorporated herein by reference. In the interest of conciseness, those operations of the interpreter/debugger 30 which are common to standard interpreters and debuggers will not be included herein. They are described in detail in the above referenced books.

The interpreter/debugger 30 was built using the YACC tool on the TSL syntax described hereinabove and including the debugging conditions of single-stepping and breakpoints. Pseudocode describing the operation of the interpreter/debugger 30, specifically with respect to the testing and debugging extensions of the present invention, is provided in Annex C.

The editor 28 provides the interpreter/debugger 30 with its input, which is the individual characters of the TSL statement at the execution marker. The interpreter/debugger 30 first checks if any of the debugging conditions have been selected and if they have, have they been met. If so, it responds accordingly.

Subsequently, the interpreter/debugger 30 interprets the TSL statement. The interpreter/debugger 30 executes standard AWK commands as described in the book *The AWK Programming Language*.

For the TSL statements call_id and treturn, the interpreter/debugger 30 operates as described hereinabove and as listed, in pseudocode format, in Annex C.

For built-in functions, such as move_locator_track, type, sin, cos, etc., the interpreter/debugger 30 calls the appropriate function. For the standard AWK built-in functions, the interpreter/debugger 30 calls the AWK function. For the functions described hereinabove, the interpreter/debugger sends the appropriate command to the CRV 20 in accordance with the above description.

For the function check_screen, the interpreter/debugger 30 first checks the selected system mode, either REPLAY or VERIFY, and accordingly sends the CAPTURE_SCREEN or VERIFY_SCREEN OPCODE. After the CRV 20 completes the operation, if the CRV 20 responds with an indication of a mismatch screen and the Mismatch breakpoint is active, a screen verification flag is set Which causes the interpreter/debugger Be to halt execution.

For the functions type and mtype, the interpreter/debugger 30 invokes a mini-interpreter (not shown) built with the YACC tool. The mini-interpreter operates according to the syntax provided in Annex A and in effect, performs the unraveling of the operations of the translator 24 with respect to the type and mtype functions. The output of the mini-interpreter is a sequence of KEY_PRESS, KEY_RELEASE, TIMING or MOUSE_BUTTONS operations which are sent to the CRV 20.

Operation of Editor 28

The entirety of interactions with the test workspace 26 are handled via editor 28. In this manner, any modifications to the script which the operator makes will be incorporated when the interpreter/debugger 30 next executes the edited portion of the script.

The editor 28 and the graphics user interface in which it, the interpreter/debugger 30 and the translator 24 operate were built using PRESENTATION MANAGER, a commercially available user interface tool working under the OS/2 operating system. PRESENTATION MANAGER and OS/2 are software systems produced by Microsoft Corporation of the USA. How to program with OS/2 and PRESENTATION MANAGER is described in the books *Programming in the OS/2 Presentation Manager* by C. Petzold, Microsoft Press, 1989 and *Microsoft OS/2 Programmer's Reference*, Microsoft Press, 1989. Both books are incorporated herein by reference.

The editor 28 performs the standard editing functions which are known to those skilled in the art. In the interest of conciseness, the operation of the standard editing functions will not be described herein.

In addition, the editor 28 provides the following functions to the interpreter/debugger 30 and the translator 24:

| | |
|---|---|
| get_test_script | Get a test script from a test database of scripts stored in database 21 and display the script in the test workspace 26. |
| write_string | Write a given string on the test workspace 26. |
| get_next_line | Get the next line from the test workspace 26 (for the interpreter/debugger 30). |
| move_exec_marker | Move the execution marker to a given line. |

C-like pseudocode describing the operation of the above-described functions of editor 28 is provided in Annex D.

A software listing of the present invention is included in Annex D of Applicant's copending application, U.S. Ser. No. 07/690,878.

It will be appreciated by persons skilled in the art that the present invention is not limited to what has been particularly shown and described hereinabove. Rather the scope of the present invention is defined only by the claims which follow:

Annex A: Formal Syntax of Type Strings

Type string is a (possibly null) list of elements, where each element is defined by the following YACC-formatted syntax:

```
element      ->
        key_event    |
        < seq >      |
        < timing > key_event    ->
        full_key     |
        full_key direction direction    ->   - | + seq          ->
        key - key
        seq - key key          ->   identifier | character full_key     ->   < identifier > | character
```

Annex B: Translator Pseudo-Code

The Following algorithm is activated for each input event.

```
translate_event (input_event)
{
    if (input_event is not KEY_PRESS or KEY_RELEASE or MOUSE_BUTTONS)
        terminate_type ();

switch (input_event) {
    case KEY_PRESS or KEY_RELEASE:
        if (current command is mtype)
            terminate_type ();
        write_type (input_event);

case MOUSE_BUTTONS:
        if (current command is type)
            terminate_type ();
        write_type (input_event);

case MOVE_LOCATOR_TRACK:
        write on test workspace "move_locator_track (", track_number, ")\n" ;

case SOFTKEY:
        insert_check_screen ();
    }
} write_type (input_event)
{
    if (input_event includes timing) {
        init_type ();          /* timing is time that passed since last event */
        write on test workspace "<t", timing, ">";
    }
    if (translator is in edited-key mode)
        add_edited_key (key);
    else {
        add_key (key);
        write on test workspace "-" or "+" for press or release;
    }
    if (line is too long)
        terminate_type ();
}
```

```
add_edited_key (key)
{
   switch (type of key) {
   case NORMAL_KEY:
       if (event is KEY_PRESS) {
           if (key sequence is active)
                           /* Something like ' type ("<Alt ' is written */
                   write on test workspace "_"
           add_key (key);
       }
   case SEQUENCE_KEY      /* (such as Alt, Ctrl) */
       if (event is KEY_PRESS) {
           if (key sequence is not active) {
               init_type ();
               write on test workspace "<";
           } else
                   write on test workspace "_";        /* Separator */
           push key to sequence key list;
           add_key (key);
       } else {                            /* KEY_RELEASE */
           remove key from sequence list;
           if (sequence list is empty)
                   write on test workspace ">";
       }
   case SHIFT_KEY:
       if (event is KEY_PRESS)
           shift_state = TRUE;
       else
           shift_state = FALSE;
   case CAPSLOCK_KEY:
       if (event is KEY_PRESS)
           caps_state = NOT caps_state; /* Flip caps lock state */
   }
} add_key (key)
{
   /*
   CAPS_LOCK type keys are keys affected by CAPS_LOCK; e.g. letter keys are of this
   type, but number keys are not.
   */ if (shift_state OR (caps_state AND key is of CAPS_LOCK type))
       key_name = shift name of key;       /* e.g. '*' for '8', or 'A' for 'a' */
```

```
        else
            key_name = normal name of key;
    init_type ();
    if (key_name is a one-character name)
        write key_name on test workspace;
    else {
        if (sequence list is empty)
            write on test workspace "<"
        write on test workspace "k", key_name;
        if (sequence list is empty)
            write on test workspace ">"
    }
} init_type ()
{
    if (NOT type_written) {
        if (current command is type)
            write on test workspace " type (\" ";
        else
            write on test workspace " intype (\" ";

type_written = TRUE;
    }
} terminate_type ()
{
    if (NOT type_written)
        return; /* Nothing to do */
    if (sequence list is not empty) {
        write on test workspace ">";
        erase sequence list;
    }
    write on test workspace " \");\n ";
    type_written = FALSE;
} insert_check_screen ()
{
    get from the database a new screen name, in the format "scrn_i", where i is initially set
    to zero and incremented each time;
```

```
        send CAPTURE_SCREEN command to the CRV;
        terminate_type ();
    }   write on test workspace "check_screen (\" ", screen name, "\" );\n";
```

Annex C: Interpreter / Debugger Pseudo-Code

The following pseudo-code describes the execution of a TSL statement, after it was parsed by YACC. Only the execution of the special extensions related to testing and debugging are detailed - the other parts are standard AWK interpreter.

```
execute_statement ()
{
    Move the execution marker to the script line corresponding to the current statement;

check_debug ();

switch (statement type)
    case ASSIGNMENT:
        execute assignment...
    case LOOP:
        ..
    /* (etc. - handle all standard commands) */ case CALL: /* Test Call */
        save current test and execution line number;
        call editor to display called test;
        evaluate and push test parameters on calling stack;
        set execution marker to line #1;
        if (setjmp (test_tag) == 0)
            call interpreter (recursively) to interpret and execute called test;

/* Execution gets to this point after test is returned */
        call editor to display calling test;
        set execution marker to saved line;
        pop parameters from stack;

case TRETURN:
        longjmp (test_tag);

case BUILTIN_FUNCTION:
        call appropriate function;
    }
} check_debug ()
{
    /* This routine checks if various debug conditions were met */ if (single_stepping is on    OR
```

```
        execution got to breakpoint line    OR
        last screen verification failed AND Mismatch Break is on   OR
        user aborted the test)
    then
            halt execution until the user give next RUN or SINGLE-STEP command;
}
```

Annex D: Editor Pseudo-Code

```
get_test_script (test_name)
{
    /* Get test script from database and display it on test workspace */ get script text file name from database;
    open script text file;
    while (more lines in file) {
        read line from file;
        put line on test workspace;
    }
    remove cut&paste buffer indication;
    position execution marker on top of test workspace;
} write_string (string)
{
    /* Write the given string on the test workspace */ loop (characters of string) {
        if (character == '\n') { /* New line */
            add line to test workspace;
            shift forward all lines below current line by one;
            if (execution marker is below current line)
                move execution marker by one;
            if (new line is below test window)
                scroll forward test workspace by half a page;
        } else /* Normal character */
            add character to current line;
    }
} get_next_line ()
{
    /*
    Get the next line from the test workspace (for the interpreter). The last line passed to
    the interpreter is pointed by an internal variable named the compile marker. Normally,
    it is one line ahead of the execution marker (except for structures such as loops, where
    the execution marker moves through the loop lines, while the compile marker rests on
    the end of the structure)
    */ if (compile marker is placed on the end of test)
        return END_OF_TEST;         /* In this case, the interpreter halts */
```

```
    else {
        advance compile marker by one line;
        return the line on which the compile marker points;
    }
} move_exec_marker (line)
{
    /* Move the execution marker to a given line */ remove indication from current execution line;
    if (line not displayed in test window)
        scroll test so that line will be in the center of test window;
    highlight line with the execution marker indication;
}
```

We claim:

1. A system for developing and executing test scripts of a System Under Test (SUT), said SUT having at least a Central Processing Unit (CPU) and an initial operating state, said system for developing and executing test scripts comprising:
- a test workspace for holding and displaying a test script formed of human-readable test commands;
- manipulation means, operative on said test workspace, for enabling an operator to edit said test script and to indicate at least the beginning of a portion of said test script to be executed;
- execution means for receiving at least said beginning of said portion of said test script and for testing said SUT in accordance with said test commands within said portion; and
- a test manager, operating said manipulation and execution means, for enabling said operator to at least a) start and stop execution of portions of said test script which are present before or after a previously executed portion and b) edit said test script at any time.

2. A system according to claim 1 wherein said SUT includes a screen and input means and wherein said system also includes transformation means, activatable and closeable by said operator through said test manager, for transforming at least one of an operator command from said input means and a screen image visible on said screen to a corresponding higher level test command and for entering said test command into said test workspace.

3. A system according to claim 1 and wherein said manipulation means comprises editor means for editing said test commands and said execution means comprises interpreter means for causing at least a portion of said test script to be executed by said SUT without performing any preliminary processing on said portion of said script.

4. A system according to claim 3 wherein said editor means includes means for providing an execution marker indicating a currently executed test command and wherein said execution means includes means for indicating to said editor means to move said execution marker to a next test command to be executed.

5. A system according to claim 4 and wherein said editor means includes execution marker moving means enabling a user to move said execution marker to a desired next test command to be executed.

6. A system according to claim 1 and wherein said test commands comprise commands imitating operator input actions and commands for screen capture and verify operations.

7. A system according to claim 1 wherein said execution means includes debugger means for providing a user with a plurality of selectable debug conditions and for halting execution of said script when one of said debug conditions is met.

8. A system according to claim 7 wherein one of said debug conditions is 'Break on Mismatch' which causes said debugger means to halt execution if a screen verification fails.

9. A system according to claim 1 and including means for aborting execution of a test and for returning to the test workspace.

10. A method for developing and executing test scripts of a System Under Test (SUT), said SUT having a Central Processing Unit (CPU) and an initial operating state, said method comprising the steps of:
- holding and displaying a test script within a continually active test workspace, said test script formed of human-readable test commands;
- enabling an operator to edit said test script within said test workspace and to indicate at least the beginning of a portion of said test script to be executed;
- receiving said at least said beginning of said portion of said test script;
- testing said SUT in accordance with said test commands within said portion; and
- enabling said operator to at least a) start and stop execution of portions of said test script which are present before or after a previously executed portion and b) edit said test script at any time.

11. A method according to claim 10 wherein said SUT includes a screen and input means and wherein said system also includes transformation means, activatable and closeable by said operator through said test manager, and wherein said method includes the step of transforming at least one of an operator command from said input means and a screen image visible on said screen to a corresponding higher level test command and for entering said test command into said test workspace.

12. A method according to claim 10 and wherein said first step of enabling includes the step of editing said test commands and wherein said step of executing comprises the step of causing at least a portion of said desired script to be executed by said SUT without performing any preliminary processing on said portion of said script.

13. A method according to claim 12 wherein said step of editing includes the step of providing an execution marker which indicates a currently executed test command and wherein said step of executing includes the step of moving said execution marker to a next test command to be executed.

14. A method according to claim 13 and wherein said step of editing includes the step of enabling a user to move said execution marked to a desired next test command to be executed.

15. A method according to claim 10 wherein said step of executing includes the steps of providing a user with a plurality of selectable debug conditions and halting execution of said script when one of said debug conditions is met.

16. A system for developing and executing with test scripts of a System Under Test (SUT), the system for developing and executing test scripts comprising:
- an execution marker;
- a test workspace for holding and displaying a test script formed of human-readable test commands and for displaying said execution marker;
- manipulation means, operative on said test workspace, for enabling an operator to move said execution marker to any test command within said script, said test command becoming a beginning command indicating the beginning of a test to be performed; and
- execution means for receiving said beginning command from said manipulation means and for testing said SUT in accordance with said test script beginning at said beginning test command.

17. A system according to claim 16 and wherein said execution means additionally comprises means for instructing said manipulation means to move said execution marker to the test command currently being executed by said execution means.

18. A method for developing and executing test scripts of a System Under Test (SUT), the method comprising the steps of:
- holding and displaying a test script within a test workspace, said test script formed of human-readable test commands;

displaying an execution marker within said test workspace;

enabling an operator to move said execution marker to any test command within said script, said test command becoming a beginning command indicating the beginning of a test to be performed;

receiving said beginning command from said manipulation means; and testing said SUT in accordance with said test script beginning at said beginning test command.

19. A method according to claim 18 and wherein said step of testing additionally comprises the step of moving said execution marker to the test command currently being executed by said step of testing.

* * * * *